(12) United States Patent
Toivola et al.

(10) Patent No.: US 10,056,775 B2
(45) Date of Patent: Aug. 21, 2018

(54) APPARATUS, METHOD, AND COMPUTER PROGRAM FOR CHARGING CABLE LOSS COMPENSATION

(75) Inventors: Timo Tapani Toivola, Turku (FI); Janne Antero Sovela, Turku (FI)

(73) Assignee: Nokia Technologies Oy, Espoo (FI)

(*) Notice: Subject to any disclaimer, the term of this patent is extended or adjusted under 35 U.S.C. 154(b) by 614 days.

(21) Appl. No.: 14/422,486

(22) PCT Filed: Aug. 20, 2012

(86) PCT No.: PCT/IB2012/054208
§ 371 (c)(1),
(2), (4) Date: Jul. 6, 2015

(87) PCT Pub. No.: WO2014/030029
PCT Pub. Date: Feb. 27, 2014

(65) Prior Publication Data
US 2015/0303713 A1    Oct. 22, 2015

(51) Int. Cl.
*H02J 7/00* (2006.01)
*H02J 7/04* (2006.01)
*H02J 9/08* (2006.01)

(52) U.S. Cl.
CPC ............ *H02J 7/007* (2013.01); *H02J 7/0052* (2013.01); *H02J 7/04* (2013.01); *H02J 2007/0062* (2013.01)

(58) Field of Classification Search
CPC .. H02J 7/007; H02J 7/0052; H02J 7/04; H02J 2007/0062; H02J 7/14; H02J 7/0068; H02J 7/0042; H02J 7/0045; H02J 7/0081; H02J 7/008; H02J 7/0093; Y02E 60/12; H01M 10/44; H01M 10/441; H01M 10/46; H02H 7/045; H02H 3/28; H02H 7/0455; H02H 3/44; H02H 3/162; H02H 11/001;

(Continued)

(56) References Cited

U.S. PATENT DOCUMENTS 5,861,733 A    1/1999   Yoshikawa
6,163,136 A    12/2000  Celenza (Continued)

OTHER PUBLICATIONS

International Search Report and Written Opinion received for corresponding Patent Cooperation Treaty Application No. PCT/IB2012/054208, dated Mar. 6, 2013, 13 pages.

*Primary Examiner* — Yalkew Fantu
*Assistant Examiner* — Mohammed J Sharief
(74) *Attorney, Agent, or Firm* — Ditthavong & Steiner, P.C.

(57) ABSTRACT

It is inter alia disclosed to an apparatus (100), comprising an interface (110) configured to be connected to a cable, the interface (110) comprising a first terminal (111) configured to be connected to a first line of the cable, a second terminal (112) configured to be connected to a second line of the cable, and a third terminal (113) configured to be connected to a shield line of the cable, and comprising a charger (120) configured to provide a voltage between the first terminal (111) and the second terminal (112), wherein said voltage is based on a predefined voltage and a compensation voltage, the compensation voltage being dependent on a voltage between the third terminal (113) and the second terminal (112).

20 Claims, 5 Drawing Sheets

(58) Field of Classification Search
CPC ...... H02H 5/083; H01F 27/402; H01H 83/02;
B28D 1/14
USPC ............. 320/107, 161, 162; 361/36, 50
See application file for complete search history.

(56) References Cited

U.S. PATENT DOCUMENTS

| | | | |
|---|---|---|---|
| 6,211,649 B1* | 4/2001 | Matsuda | G06F 1/266 |
| | | | 320/115 |
| 2002/0000788 A1 | 1/2002 | Ostyergaard et al. | |
| 2007/0024239 A1* | 2/2007 | Park | G06F 1/263 |
| | | | 320/114 |
| 2007/0278999 A1* | 12/2007 | Hsia | H02J 7/00 |
| | | | 320/111 |
| 2008/0157733 A1* | 7/2008 | Williams | H02M 3/07 |
| | | | 323/266 |
| 2008/0231235 A1* | 9/2008 | Thijssen | H02J 7/0052 |
| | | | 320/138 |
| 2009/0289604 A1 | 11/2009 | Carkner | |
| 2011/0221604 A1* | 9/2011 | Johnson | H02J 7/0052 |
| | | | 340/664 |
| 2012/0064772 A1 | 3/2012 | Pocrass | |

\* cited by examiner

APPARATUS, METHOD, AND COMPUTER PROGRAM FOR CHARGING CABLE LOSS COMPENSATION

RELATED APPLICATION

This application was originally filed as PCT Application No. PCT/IB2012/054208 filed Aug. 20, 2012.

FIELD

Embodiments of this invention relate to apparatuses comprising an interface for providing a voltage, wherein the interface is configured to be connected to cable.

BACKGROUND

Charging via USB cable according USB Battery Charging specification is most common phone charging method today. Now batteries and currents are increasing, but USB cables do not allow increased current caused by loss increase on cable.

For instance, devices are charged through μUSB connection with good interoperability by help of common charging standard. USB chargers work fine with old 500 mA USB standard no matter fixed cable or detachable cable since all USB cables are certified to fulfill 500 mA capability. Nowaday charging current may be needed up to 1500 mA or more and same time market may demand detachable cables for USB chargers equipped with USB A socket. However, most popular cables are still those max loss cables (0.5Ω loop resistance) and so preventing charger current rise above 1000 mA due to the voltage loss on cable (e.g., 5V−0.5V=4.5V). So wall charges are easily capable to deliver 5V and 1.5 A and phone can charge above 1 A, but only with low loss cables which may be very thick. In practice 1.5 A chargers and 1.5 A charging phones are useless with popular flexible USB cables limiting current <1 A.

So far cable losses are compensated for with higher supply voltage while high current is measured on supply. This works only when cable loss is known beforehand and so works only with fixed cables. Markets and regulations on some countries may require detachable cable of which loss is unknown preventing compensation with voltage tuning.

Another way to avoid or reduce cable losses would be using just thicker cable, but this will cost more due to copper cost and thick cable may ruin usability and design with really stiff structure, e.g. due a cable memory effect.

SUMMARY OF SOME EMBODIMENTS OF THE INVENTION

Thus, improving compensating for a cable loss may be desirable.

According to a first exemplary embodiment of an aspect of the invention, an apparatus is disclosed, the apparatus comprising an interface configured to be connected to a cable, the interface comprising a first terminal configured to be connected to a first line of the cable, a second terminal configured to be connected to a second line of the cable, and a third terminal configured to be connected to a shield line of the cable, and a charger configured to provide a voltage between the first terminal and the second terminal, wherein said voltage is based on a predefined voltage and a compensation voltage, the compensation voltage being dependent on a voltage between the third terminal and the second terminal.

According to a second exemplary embodiment of an aspect of the invention, a method is disclosed, the method comprising
providing a voltage between a first terminal and a second terminal of an interface of the apparatus, the interface being configured to be connected to a cable, wherein the first terminal is configured to be connected to a first line of the cable, the second terminal is configured to be connected to a second line of the cable, and wherein the interface comprises a third terminal configured to be connected to a shield line of the cable, wherein said provided voltage is based on a predefined voltage and a compensation voltage, the compensation voltage being dependent on a voltage between the third terminal and the second terminal.

According to a third exemplary embodiment of an aspect of the invention, an apparatus is disclosed, which is configured to perform the method according to an aspect of the invention, or which comprises means for providing a voltage between a first terminal and a second terminal of an interface of the apparatus, the interface being configured to be connected to a cable, wherein the first terminal is configured to be connected to a first line of the cable, the second terminal is configured to be connected to a second line of the cable, and wherein the interface comprises a third terminal configured to be connected to a shield line of the cable, wherein said provided voltage is based on a predefined voltage and a compensation voltage, the compensation voltage being dependent on a voltage between the third terminal and the second terminal.

According to a fourth exemplary embodiment of the an aspect of the invention, an apparatus is disclosed, comprising at least one processor and at least one memory including computer program code, the at least one memory and the computer program code configured to, with the at least one processor, cause the apparatus at least to perform the method according to an aspect of the invention. The computer program code included in the memory may for instance at least partially represent software and/or firmware for the processor. Non-limiting examples of the memory are a Random-Access Memory (RAM) or a Read-Only Memory (ROM) that is accessible by the processor.

According to a fifth exemplary embodiment of an aspect of the invention, a computer program is disclosed, comprising program code for performing the method according to an aspect of the invention when the computer program is executed on a processor. The computer program may for instance be distributable via a network, such as for instance the Internet. The computer program may for instance be storable or encodable in a computer-readable medium. The computer program may for instance at least partially represent software and/or firmware of the processor.

According to a sixth exemplary embodiment of an aspect of the invention, a computer-readable medium is disclosed, having a computer program according to an aspect of the invention stored thereon. The computer-readable medium may for instance be embodied as an electric, magnetic, electro-magnetic, optic or other storage medium, and may either be a removable medium or a medium that is fixedly installed in an apparatus or device. Non-limiting examples of such a computer-readable medium are a RAM or ROM. The computer-readable medium may for instance be a tangible medium, for instance a tangible storage medium. A computer-readable medium is understood to be readable by a computer, such as for instance a processor.

In the following, features and embodiments pertaining to all of these above-described aspects of the invention will be briefly summarized.

The apparatus comprises an interface which is configured to be connected to a cable. The interface comprises a first terminal, a second terminal and a third terminal. The first terminal is configured to be connected to a first line of the cable, the second terminal is configured to be connected to a second line of the cable, and the third terminal is configured to be connected to a shield line of the cable when the cable is connected to the interface. As an example, the shield line of the cable may represent any kind of electrical shielding used for the cable, e.g. it may represent a shield wire and/or it may represent a shielding which at least partially surrounds the first and/or the second line of the cable.

For instance, the cable may be permanently connected to the interface, i.e., the cable may be fixed to the interface, or, as another example, the interface and the cable may be configured to be connected to each other and to be disconnected to each other, wherein, for instance, the interface may represent a plug or a socket or any other suited connector and the cable may comprise a corresponding socket or plug or other suited connector configured to be connected to the interface.

The apparatus further comprises a charger configured to provide a voltage between the first terminal and the second terminal of the interface. For instance, the first terminal may represent a power terminal and the second terminal may represent a ground terminal, wherein the electric potential of said ground terminal may for instance be assumed to be zero, or, as another example, the second terminal may present a power terminal and the first terminal may represent a ground terminal, wherein the electric potential of said ground terminal may for instance be assumed to be zero.

Accordingly, apparatus may be used for charging a further apparatus which may be connected via a cable to the interface of the apparatus. After being connected, the further apparatus can be charged via the first and second terminals of the interface and the first and second line of the connected cable.

The voltage provided between the first terminal and the second terminal of the interface is based on a predefined voltage and a compensation voltage. For instance, the provided voltage may be denoted as $V_i$, the predefined voltage may be denoted as $V_p$ and the compensation voltage may be denoted as $V_c$, wherein the provided voltage $V_i$ may for instance be considered to represent a function of the predefined voltage $V_p$ and the compensation voltage $V_c$, i.e., $V_i=f(V_p, V_c)$ may hold.

As an example, the predefined voltage may represent a voltage used for charging and/or for providing power to the further apparatus under the assumption that a cable used for charging has no losses, i.e., no significant voltage drop is caused by the cable. For instance, if the interface represents an USB interface, this predefined voltage may for instance be assumed to be approximately or exactly $V_i=5V$, but the predefined voltage may represent another, different voltage depending on the scenario which may depend on the connected further apparatus. Furthermore, the predefined voltage may change during operation. For instance, this change may occur since the charger does not represent an ideal voltage source but rather a real implementation, and/or, as another example, this change may occur due to an internal regulation of the voltage by means of the charger.

The compensation voltage $V_c$ is dependent on a voltage between the third terminal and the second terminal of the interface. Under the assumption that the cable is connected interface, the voltage between the terminal and the second terminal may be considered as a representative for a cable loss. Thus, for instance, the compensation voltage $V_c$ may be considered as a voltage which is used for compensating for a voltage drop on the cable when providing power through the cable to a further apparatus, wherein this compensation voltage $V_c$ may be considered to depend on a cable loss measured or determined or estimated by means of using the shield line of the cable due to using the voltage between the third terminal and the second terminal for obtaining the compensation voltage $V_c$. The compensation voltage $V_c$ may be considered to represent a positive voltage, i.e., $V_c \geq 0$ may hold.

Accordingly, for instance, the voltage between the third terminal and the second terminal may be considered to be indicative of a voltage drop occurred in the connected cable.

The charger is configured to provide the voltage $V_i$ between the first terminal and the second terminal based on the predefined voltage $V_p$ and the compensation voltage $V_c$. For instance, the compensation voltage $V_c$ may be estimated or determined based on the voltage between third terminal and the second terminal of the interface. As a non-limiting example, for instance, the charger may be configured to shift the predefined voltage $V_p$ with the compensation voltage $V_c$ for providing the voltage $V_i$ between the first and second terminal, i.e., $V_i=V_p+V_c$ may hold.

As an example, the charger may comprise a regulator which is configured to provide voltage $V_p$ based on the predefined voltage $V_p$ and the compensation voltage $V_c$. Thus, for instance, when the compensation voltage $V_c$ changes during operation, e.g. caused by a decreased or increased charging current supplied through a cable connected to the interface, wherein this change may be detected based on a change of the voltage between the third terminal and the second terminal, the regulator of the charger may change the voltage $V_i$ provided between the first terminal and the second terminal accordingly. Accordingly, it may be ensured that the correct charging voltage is provided to the further apparatus connected to the cable.

For instance, the apparatus may comprise a power supply interface configured to be connected to a power supply, wherein the charger may be configured to receive power from this power supply through the power supply interface. The power supply may represent an external power supply like a mains power supply providing a voltage between 100V and 420V, preferably between 110V and 240V, or might represent an external power supply providing a voltage between 3V and 48V, preferably between 5V and 19V. For instance, the power supply interface may comprise a plug which is configured to be connected to the external power supply.

As another example, the apparatus might comprise an internal energy source which is configured to provide power to the charger. For instance, this internal energy source might represent a rechargeable energy source like a battery and/or a capacitor or any other kind of well-suited rechargeable energy source.

For instance, the rechargeable energy source might be used in combination with the power supply interface, wherein the rechargeable energy source might configured to provide power to the charger when no or not enough power is received from an external power supply through the power supply interface, and if enough power is received from the external power supply, the power received from the external power supply may be used for charging the rechargeable energy source while simultaneously providing power to the charger 140.

For instance, it may be assumed that when a first end of the cable is connected to the interface of the apparatus and when a second end of the cable being different from the first end is connected to a further apparatus, and under the assumption that the electrical potential of either the first line at the second end of the cable or of the second line at the second end of the cable is the same as the electrical potential of the third line at the second end of the cable when the cable is connected to the apparatus and/or the further apparatus, which might for instance be performed based on an electrical connection between one of the first line or second line at the second end of the cable and the shield line at the second end of the cable as a part of the cable and/or based on an electrical connection between one of a first terminal and a second terminal of an interface of the further apparatus with a third terminal of the interface of the further apparatus, wherein the interface of the further apparatus is configured to receive the second end of the cable and wherein the first terminal, the second terminal and the third terminal of this interface are configured to be connected to the first line, the second line and the shied line at the second end of the cable.

As an example, it may now be assumed without any limitations, that the electrical potential of the second line at the second end of the cable is the same as the electrical potential of the shield line at the second end of the cable.

It may be assumed that no current or only a very small current flows through the shield line of the cable when the cable is connected to the apparatus and the further apparatus, since the main part or all part of the current provided from the charger to the further apparatus flows through the first line and the second line of the cable.

Accordingly, no voltage drop or only a very small voltage drop occurs on the shield line, whereas a significant voltage drop may occur on the first line and on the second line, as explained above. This absence of a voltage drop on the shield line may be used for estimating or determining the voltage drop on the second line of cable, wherein the voltage between the third terminal and the second terminal of the interface of the apparatus, which may be denoted as voltage $V_e$, may substantially correspond to a voltage drop between the second line at the second end of the cable and the second line at the first end of the cable in accordance with Kirchhoff's law. Accordingly, voltage $V_e$ may be considered as a representation of the voltage drop across the second line of the cable 305 when the cable is connected to both the apparatus and the further apparatus.

Under the non-limiting assumption that the first line and the second line have a substantially same electrical resistance, the voltage drop across the first line will be approximately the same as the voltage drop across the second line of the cable. Accordingly, voltage $V_e$ between the third terminal and the second terminal of the interface of the apparatus may be used for estimating or determining the sum of voltage drop across both the first line and the second line of the cable, wherein this sum of voltage drop may be denoted as $V_d$ and may be twice of the voltage $V_e$ between the third terminal and the second terminal of the interface of the apparatus:

$$V_d = 2 \cdot V_e. \quad (1)$$

Or, as another example, if the resistance R1 of the first line differs from the resistance R2 of the second line, the sum of voltage drop $V_d$ may be estimated as $$V_d = V_e \cdot (1 + (R1/R2)). \quad (2)$$

Accordingly, the voltage $V_e$ between the third terminal and the second terminal of the interface of the apparatus may be considered as a representative of the sum of the voltage drop across the first line and across the second line of the cable, wherein the voltage $V_e$ may be considered to be representative of a cable loss occurred during providing power from the charger to the further apparatus. Thus, the compensation voltage $V_c$ depends on the voltage $V_e$ between the third terminal and the second terminal of the interface of the first apparatus.

For instance, the compensation voltage $V_c$ may be equal or approximately equal to the sum of the voltage drop as explained above, i.e. $V_c = V_d$ when applying equation (1) or (2) may hold.

According to an exemplary embodiment of an aspect of the invention, said compensation voltage is approximately between one and a half and two and a half of the voltage between the third terminal and the second terminal.

Thus, the compensation voltage $V_c$ may be approximately between one and a half (i.e., 1.5) and two and a half (i.e., 2.5) of the voltage $V_e$ between the third terminal and the second terminal of the interface of the apparatus.

According to an exemplary embodiment of an aspect of the invention, said charger is configured to shift the predefined voltage with the compensation voltage for providing the voltage between the first and the second terminal.

According to an exemplary embodiment of an aspect of the invention, the apparatus comprises a reference ground connected to the charger, wherein said reference ground is connected to the third terminal such that the compensation voltage is dependent on the voltage of the reference ground.

For instance, the charger may comprises a regulator which may for instance be provided with an input voltage in order to be provided by power for operating the regulator, wherein the regulator is configured to provide the voltage $V_i$ between the first terminal and the second terminal of the interface of the apparatus. The regulator may comprise an input which is connected to the reference ground.

For instance, the voltage at the reference ground may be used by the charger, and for instance in particular by the regulator, to obtain or determine the compensation voltage V. For instance, the compensation voltage $V_c$ may be obtained or determined in accordance with any of the above presented examples. The voltage at the reference ground may represent the voltage between the reference ground and the second terminal (or the first terminal) of the interface of the apparatus, for instance, under the assumption that the second terminal may be associated with a ground line, i.e., under the assumption that the electrical potential of the second line at the second end of the cable is the same as the electrical potential of the shield lien at the second end of the cable.

As an example, the charger may be configured to shift the predefined with the compensation voltage for providing the voltage $V_i$ between the first terminal and the second terminal of the interface of the apparatus.

For instance, if the voltage at the reference ground is zero since the voltage at the third terminal is the same as the voltage at the second terminal of the interface of the apparatus, the regulator of the charger may (at least inherently) determine the compensation voltage to be $V_c = 0$, and thus the regulator will only provide predefined voltage $V_p$ as voltage $V_i$ between the first terminal and the second terminal of the interface of the apparatus without any voltage shift. Otherwise, as an example, if the voltage at the reference ground is not zero, the regulator (inherently) obtains or determines the compensation voltage $V_c$ based on the voltage at the reference ground and shifts the predefined voltage predefined voltage $V_p$ with the compensation voltage $V_c$ in order to provide this shifted voltage $V_i$ between the first terminal and the second terminal of the interface of the apparatus:

$$V_i = V_p + V_c$$

The regulator may represent hardware circuitry and may optionally comprise software. For instance, obtaining the compensation voltage $V_c$ may be performed by a hardware circuitry without any software, or a software running on a processor may be used for obtaining or determining the compensation voltage $V_c$. Furthermore, as an example, it has to be understood that it may be not necessary to determine or obtain a value corresponding to the compensation voltage, but the regulator is configured to provide voltage $V_i$ between the first terminal and the second terminal based on the predefined voltage $V_p$ and the compensation voltage $V_c$, e.g. by means of the providing the predefined voltage $V_p$ shifted with the compensation voltage $V_c$, and thus the voltage $V_i$ provided between the first terminal and the second terminal by the regulator may be considered to inherently comprise the compensation voltage $V_c$.

Furthermore, regulator may be configured to adjust the voltage $V_i$ provided between the first terminal and the second terminal in predefined time intervals or continuously based on the voltage at the reference ground. Accordingly, if the current flowing through the first and second terminal of the interface of the apparatus during charging a further apparatus varies and thus a voltage drop on a connected cable would change, the voltage $V_i$ provided between the first terminal and the second terminal of the interface of the apparatus would be adapted in accordance with this change based a change of the voltage at the reference ground.

According to an exemplary embodiment of an aspect of the invention, the apparatus comprises at least one resistor placed between the third terminal and the second terminal.

Thus, the reference ground is stable even when no cable is connected to the interface of the apparatus since the reference ground is electrically connected to the second terminal.

According to an exemplary embodiment of an aspect of the invention, the resistance of said at least one resistor is in a range between 10Ω and 100Ω, preferably between 30Ω and 60Ω.

For instance, the resistance may be approximately or exactly 47Ω.

According to an exemplary embodiment of an aspect of the invention, the apparatus comprises a voltage limiting element placed between the third terminal and the second terminal.

This voltage limiting element is configured to limit the voltage between the third terminal and the second terminal to a predefined maximum voltage. Thus, for instance, this voltage limiting element may prevent that in case of a very high voltage between the third terminal and the second terminal, which may for instance occur due to a broken line in a connected cable, e.g. a broken shield line, the compensation voltage $V_c$ simultaneously increases to a very high voltage and thus, providing a very high voltage at the output of the regulator used as voltage $V_i$ between the first terminal and the second terminal can be prevented. For instance, this voltage limiting element may represent a protection diode wherein the protection diode may for instance represent a Zener diode operated in breakthrough direction, wherein the breakthrough voltage of the Zener diode represents the predefined maximum voltage. As an example, the predefined maximum voltage may be in a range between 0.5V and 3V, preferably between 1V and 2V, e.g. approximately or exactly 1.2V. Furthermore, for instance, if the shield line of the cable is broken, the charger may be configured to operate in an uncompensated mode without shifting the predefined voltage $V_p$ and/or providing a maximum current of 1 A.

Or, as another example or embodiment, the charger may comprise an optional overvoltage protection means which prevents that the voltage provided at the output of the regulator exceeds a predefined maximum output voltage. For instance, this predefined maximum output voltage may represent the sum of predefined voltage $V_p$ and a further voltage value, wherein this further voltage value may be in a range between 1V and 6V, preferably between 2V and 4V, e.g. approximately or exactly 2.4V. Furthermore, if the charger comprises this over protection means, the optional voltage limiting element may be omitted.

According to an exemplary embodiment of an aspect of the invention, the apparatus comprises an electromagnetic compatibility (EMC) element placed between the third terminal and the second terminal.

This EMC may for instance be configured to electrically connect the third terminal to second terminal for high frequencies, e.g., for frequencies higher than 1 kHz, or 10 kHz, or 100 kHz or higher than 1 MHz, or higher than any other suited frequency, wherein the EMC may be configured not to electrically connect the third terminal to second terminal for low frequencies, which are lower than the high frequency, e.g., for low frequencies less than 10 kHz, 1 kHz, 200 Hz, wherein any other well suited low frequency may be used. Thus, as an example, this EMC 550 may be represented by a high-pass.

For instance, the EMC may comprise or represent a capacitor.

Accordingly, the EMC may be configured to prevent that high frequency signals are emitted from the shield line of a cable connected to the interface of the apparatus.

According to an exemplary embodiment of an aspect of the invention, the apparatus comprises a power supply interface configured to be connected to a power supply, wherein the charger comprises a transformer being connected at the primary side to the power supply interface, the transformer being configured to transform a voltage at the primary side down to a voltage at the secondary side, wherein the charger comprises a secondary side regulator configured to provide the voltage between the first terminal and the second terminal based on the voltage at the secondary side of the transformer.

The transformer is configured to transform a voltage at the primary side down to a voltage provided at the secondary side of the transformer, wherein the charger comprises a secondary side regulator which comprises an input for receiving the voltage provided at the secondary side of the transformer or a voltage based on the voltage provided at the secondary side of the transformer and comprises an output configured to provide the voltage $V_i$ provided between the first terminal and the second terminal of the interface of the apparatus. This secondary side regulator may for instance realized by any of the regulator described above. It has to be understood that the secondary side regulator may implement any of the described methods for providing the voltage $V_i$ provided between the first terminal and the second terminal based on the predefined voltage $V_p$ and the compensation voltage $V_c$.

Accordingly, as an example, a high voltage alternating current (AC) may be provided from the power supply interface via an optional primary side regulator as primary side voltage to the transformer, or the primary side voltage may at least depend on the high voltage provided from the power supply interface, and the transformer may provide a transformed lower AC voltage to the input of the secondary side regulator which is configured to provide a direct current (DC) or, alternatively, an alternating current (AC), at the output in order to provide the DC voltage $V_i$ between the first terminal and the second terminal of the interface. Thus, the input voltage of the secondary side regulator may be used by the secondary side regulator for generating the voltage $V_i$ between the first terminal the second terminal, wherein the secondary side regulator is configured to regulate this voltage $V_i$ in order be based (or to depend) on the predefined voltage $V_p$ and the compensation voltage $V_c$, as explained above.

According to an exemplary embodiment of an aspect of the invention, the charger comprises a primary side regulator being configured to regulate the voltage at the primary side of the transformer, the charger further comprising a galvanic separation element connected to secondary side of the transformer and configured to feedback a signal from the secondary side to the primary side regulator.

Furthermore, as an example, the secondary side regulator may comprise an optional second output which may for instance be configured to provide a representative of the voltage or current at the input of the secondary side regulator or a representative of a voltage or current based on the voltage or current at the input of the secondary side regulator, e.g., based on the voltage at the secondary side of the transformer.

For instance, this voltage or current based on voltage or current at the input of the secondary side regulator may represent a rectified voltage or current obtained by rectifying the voltage or current provided at the secondary side of the transformer. This representation of the voltage/and or current may be used as a feedback signal which is fed back to a further input of the primary side regulator and may be used to regulate the voltage or current provided at the output of the primary side regulator.

For instance, an optional decoupling element may be placed between the further input of the primary side regulator and the further output of the secondary side regulator, where the optional decoupling element may be configured to perform a galvanic separation. Thus, the decoupling element may represent a galvanic separation element which is configured to perform a galvanic separation between the further output of the secondary side regulator and the further input of the primary side regulator. For instance, this galvanic separation element may represent an optocoupler.

According to an exemplary embodiment of an aspect of the invention, said first terminal represents a power terminal and the second terminal represents ground terminal.

According to an exemplary embodiment of an aspect of the invention, the interface configured to be connected to a cable represents a USB interface.

According to a exemplary embodiment of further aspect of the invention, a system is disclosed, comprising an apparatus according to the aspect of the invention, a cable comprising a first line, a second line and a shield line, wherein a first end of the cable is connected to the interface of the first apparatus such that the first line is connected to the first terminal, the second line is connected to the second terminal, and the shield line is connected to the third terminal, a second apparatus comprising an interface configured to be connected to the cable, wherein a second end of the cable is connected to the interface of the second apparatus, and wherein the electrical potential of one of the first line and the second line at the second end of the cable and the electrical potential of the shield line at the second are substantially the same.

According to a exemplary embodiment of further aspect of the invention, the interface of the second apparatus is configured to connect the ground line and the shield line of a cable connected to the interface of the second apparatus to each other.

According to an exemplary embodiment of further aspect of the invention, said interface of the second apparatus represents a USB interface.

Thus, the interface of the first apparatus may represent a USB interface, the cable may represent a USB cable, which may also be configured to perform USB data transmission and thus may comprise at least two further data lines and respective data terminals at the interfaces at the first and second end of the cable, and the interface of the second apparatus may represent a USB interface.

Other features of all aspects of the invention will be apparent from and elucidated with reference to the detailed description of embodiments of the invention presented hereinafter in conjunction with the accompanying drawings. It is to be understood, however, that the drawings are designed solely for purposes of illustration and not as a definition of the limits of the invention, for which reference should be made to the appended claims. It should further be understood that the drawings are not drawn to scale and that they are merely intended to conceptually illustrate the structures and procedures described therein. In particular, presence of features in the drawings should not be considered to render these features mandatory for the invention.

DETAILED DESCRIPTION OF EMBODIMENTS OF THE INVENTION

Figure 1:
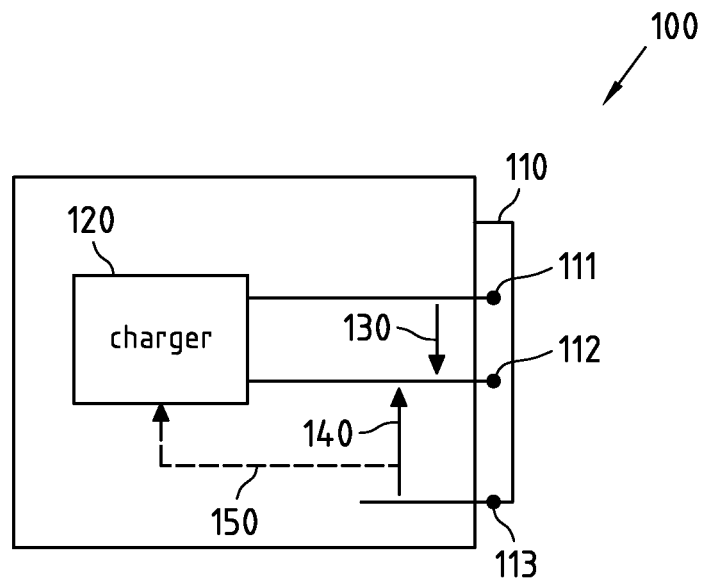
FIG. 1: A first example embodiment of an apparatus according to an aspect of the invention.

FIG. 1 depicts a first example embodiment of an apparatus 100 according to an aspect of the invention. This first example embodiment of an apparatus will be explained in conjunction with the flowchart 200 of a first example embodiment of a method 200 according to an aspect of the invention shown in FIG. 2. The steps of this flowchart 200 may for instance be defined by a program code of a computer program that is stored on a tangible storage medium. Tangible storage medium may for instance embody a program memory, and the computer program may then be executed by a processor.

Apparatus 100 comprises an interface 110 which is configured to be connected to a cable (not depicted in FIG. 1). The interface 110 comprises a first terminal 111, a second terminal 112 and a third terminal 113. The first terminal 111 is configured to be connected to a first line of the cable, the second terminal 112 is configured to be connected to a second line of the cable, and the third terminal 113 is configured to be connected to a shield line of the cable when the cable is connected to the interface 110. As an example, the shield line of the cable may represent any kind of electrical shielding used for the cable, e.g. it may represent a shield wire and/or it may represent a shielding which at least partially surrounds the first and second line of the cable.

For instance, the cable may be permanently connected to the interface 110, i.e., the cable may be fixed to the interface 110, or, as another example, the interface 110 and the cable may be configured to be connected to each other and to be disconnected to each other, wherein, for instance, the interface 110 may represent a plug or a socket and the cable may comprise a corresponding socket or plug configured to be connected to the interface 110.

Furthermore, for instance, the interface 110 may comprise at least one further terminal and/or the cable may comprise at least one further line, wherein each of the at least one further line may be configured to be connected to a respective terminal of the at least one further terminal of the interface 110. As an example, the interface 110 may represent a serial interface, e.g. a USB interface or any other well-suited interface.

The apparatus 100 further comprises a charger 120 configured to provide a voltage 130 between the first terminal 111 and the second terminal 112 of the interface 110. For instance, the first terminal 111 may represent a power terminal 111 and the second terminal 112 may represent a ground terminal 112, wherein the electric potential of said ground terminal 112 may for instance be assumed to be zero.

Accordingly, apparatus 100 may be used for charging a further apparatus which may be connected via the cable to interface 110 of the apparatus. After being connected, the further apparatus can be charged via the first and second terminals 111, 112 of the interface 110 and the first and second line of the connected cable.

Figure 2:
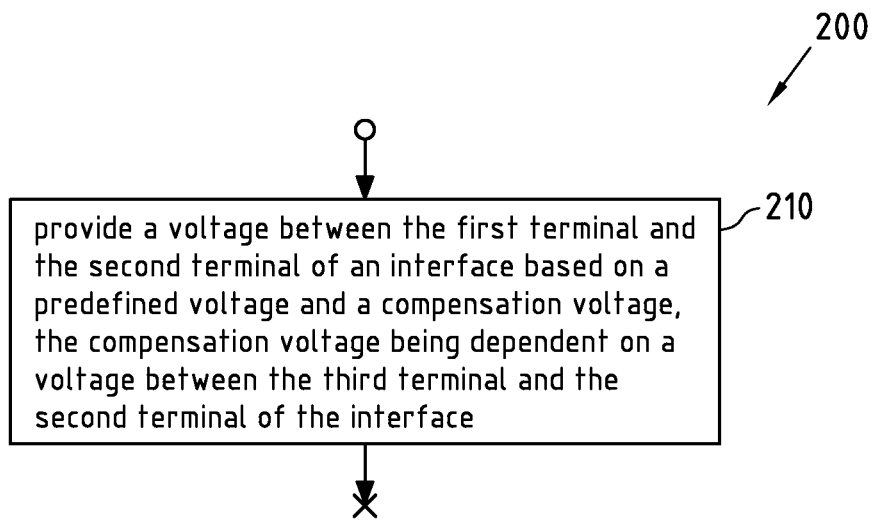
FIG. 2: a flowchart of a first example embodiment of a method according to an aspect of the invention.

As indicated by step 210 in FIG. 2, the voltage 130 provided between the first terminal 111 and the second terminal 112 of the interface 110 is based on a predefined voltage and a compensation voltage. For instance, the provided voltage 130 may be denoted as $V_i$, the predefined voltage may be denoted as $V_p$ and the compensation voltage may be denoted as $V_c$, wherein the provided voltage $V_i$ may for instance be considered to represent a function of the predefined voltage $V_p$ and the compensation voltage $V_c$, i.e., $V_i = f(V_p, V_c)$ may hold.

As an example, the predefined voltage may represent a voltage used for charging the further apparatus under the assumption that a cable used for charging has no losses, i.e., no significant voltage drop is caused by the cable. For instance, if the interface 110 represents an USB interface, this predefined voltage may be assumed to be approximately or exactly $V_i = 5V$, but the predefined voltage may represent another, different voltage depending on the scenario which may depend on the connected further apparatus. Furthermore, the predefined voltage may change during operation. For instance, this change may occur since the charger does not represent an ideal voltage source but rather a real implementation, and/or, as another example, this change may occur due to an internal regulation of the voltage by means of the charger.

The compensation voltage $V_c$ is dependent on a voltage 140 between the third terminal 113 and the second terminal 112 of the interface 110, as exemplarily indicated in FIG. 1. Under the assumption that the cable is connected interface, the voltage 140 between the terminal 113 and the second terminal 112 may be considered as a representative for a cable loss, as will be explained more detail in the sequel. Thus, for instance, the compensation voltage $V_c$ may be considered as a voltage which is used for compensating for a voltage drop on the cable when providing power through the cable to a further apparatus, wherein this compensation voltage $V_c$ may be considered to depend on a cable loss measured or determined or estimated by means of using the shield line of the cable due to using the voltage between the third terminal 113 and the second terminal 112 for obtaining the compensation voltage. Accordingly, for instance, the voltage between the third terminal 113 and the second terminal 112 may be considered to be indicative of a voltage drop occurred in the connected cable.

The charger 120 is configured to provide the voltage $V_i$ 130 between the first terminal 111 and the second terminal 112 based on the predefined voltage $V_p$ and the compensation voltage $V_c$, as exemplarily indicated by dashed line 150 in FIG. 1. For instance, the compensation voltage $V_c$ may be (at least inherently) estimated or determined based on the voltage between third terminal 113 and the second terminal 112 of the interface 110. As a non-limiting example, the charger 120 may be configured shift the predefined voltage $V_p$ with the compensation voltage $V_c$ for providing the voltage $V_i$ between the first and second terminal, i.e., $V_i = V_p + V_c$ may hold.

As an example, the charger 120 may comprise a regulator which is configured to provide voltage $V_p$ based on the predefined voltage $V_p$ and the compensation voltage $V_c$. Thus, for instance, when the compensation voltage $V_c$ changes during operation, e.g. caused by a decreased or increased charging current supplied through a cable connected to the interface 110, wherein this change may be detected based on a change of the voltage between the third terminal 113 and the second terminal 112, the regulator of the charger 120 may change the voltage $V_i$ provided between the first terminal 111 and second terminal 112 accordingly. Accordingly, it can be ensured that the correct charging voltage is provided to the further apparatus connected to the cable.

For instance, the apparatus 100 may comprise a power supply interface configured to be connected to a power supply, wherein the charger 120 may be configured to receive power from this power supply through the power supply interface. The power supply may represent an external power supply like a mains power supply providing a voltage between 100V and 420V, preferably between 110V and 240V, or might represent an external power supply providing a voltage between 3V and 48V, preferably between 5V and 19V. For instance, the power supply interface may comprise a plug which is configured to be connected to the external power supply.

As another example, the apparatus 100 might comprise an internal energy source which is configured to provide power to the charger. For instance, this internal energy source might represent a rechargeable energy source like a battery and/or a capacitor or any other kind of well-suited rechargeable energy source.

For instance, the rechargeable energy source might be used in combination with the power supply interface, wherein the rechargeable energy source might configured to provide power to the charger 120 when no or not enough power is received from an external power supply through the power supply interface, and if enough power is received from the external power supply, the power received from the external power supply may be used for charging the rechargeable energy source while simultaneously providing power to the charger 120.

Figure 3:
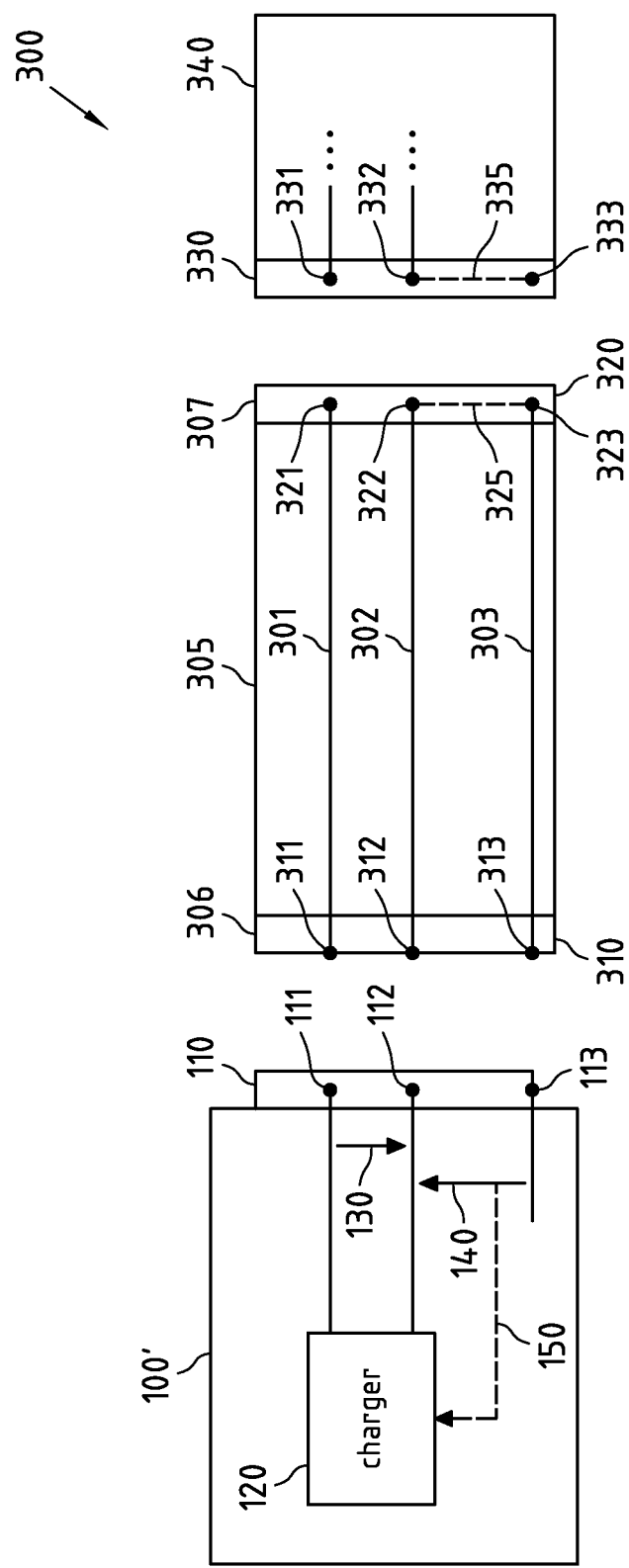
FIG. 3: a first example embodiment of a system according to an aspect of the invention.

FIG. 3 depicts a first example embodiment of a system 300 according to an aspect of the invention. This system 300 comprises a first apparatus 100' which may correspond to apparatus 100 as mentioned with respect to first embodiment of an apparatus according to an aspect of the invention. Furthermore, the system 300 comprises a cable 305 and a second apparatus 340, wherein the cable 305 and the second apparatus 340 may represent the cable and the further apparatus mentioned with respect to the explanations given for FIGS. 1 and 2.

The cable 305 comprises a first interface 310 and a second interface 320, wherein the first interface 310 may be placed at a first end 306 of cable 305 and the second interface 320 may be placed at a second end 307 of cable 305. The cable 305 comprises a first line 301, a second line 302 and a shield line 303. When the first end 306 of the cable 305 is connected to the interface 110 of the first apparatus 100', the first line 301 is connected to the first terminal 111 of the interface 110 of the first apparatus 100', the second line 302 is connected to the second terminal 112 of the interface 110 of the first apparatus 100', and the shield line 303 is connected to the second terminal 113 of the interface 110 of the first apparatus 100', e.g. by means of connecting the first terminal 311, the second terminal 312 and the third terminal 313 of the first interface 310 of cable 305 to the first terminal 111, the second terminal 112 and the third terminal 113 of the interface 110 of the first apparatus 110', respectively.

The second apparatus 340 comprises an interface 330 which is configured to be connected to the second end 307 of the cable. For instance, the second apparatus 340 may comprise an interface 330 comprising a first terminal 331, a second terminal 332, and a third terminal 333, wherein the first terminal of the interface 330 of the second apparatus 340 is configured to be connected to the first terminal 321 of the second interface 320 of cable 305, wherein the second terminal 332 of the interface 330 of the second apparatus 340 is configured to be connected to the second terminal 322 of the second interface 320 of cable 305, and wherein the third terminal 333 of the interface 330 of the second apparatus 340 is configured to be connected to the third terminal 323 of the second interface 320 of cable 305.

Accordingly, when the first end 306 of cable 305 is connected to the first apparatus 100' and the second end 307 of cable 305 is connected to the second apparatus 340, the charger 120 of the first apparatus 100' can provide power through the first line 301 and the second line 302 of cable 305. The voltage between the first terminal 331 and the second terminal 332 of the interface 330 of the second apparatus 340 may be less than the voltage 130 provided by the charger 120 between the first terminal 111 and the second terminal 112 of the interface of the first apparatus due to losses on the cable 305. In particular, the electrical resistance of the first line 301 and of the second line 302 of the cable 305 may cause a significant voltage drop on these lines 301, 302 when a current flowing through these lines 301, 302 is high.

For instance, when the second end 307 of the cable 305 is connected to the interface 330 of the second apparatus 304, the electrical potential of one of the first line 301 and the second line 302 at the second end 307 of the cable 305 and the electrical potential of the shield line 303 at the second end 307 of the cable 305 are substantially the same. For instance, the electrical potential of one of the first terminal 321 and the second terminal 302 of the second interface 320 of the cable 305 and the electrical potential of the third terminal 323 of the second interface 320 of the cable 305 may be substantially the same. As an example, it may be assumed in the sequel, without any limitation, that the electrical potential of the second line 302 at the second end 307 of the cable 305 is substantially equal to the electrical potential of the shield line 303 at the second end 307 of the cable 305, i.e., e.g. the electrical potential of the second terminal 322 of the second interface 320 of the cable 305 may be substantially equal to the electric potential of the third terminal 323 of the second interface 320 of the cable 305, when the cable 307 is connected to the interface 330 of the second apparatus 340.

For instance, this substantial equal potential may be achieved by means of a connection 335 between the second terminal 332 and the third terminal 333 of the interface 330 of the second apparatus 340, as exemplarily depicted by dashed line 335 in FIG. 2. Accordingly, when cable 305 is connected to the interface 330 of the second apparatus 340 the second terminal 322 and the third terminal 323 of the second interface 320 of cable 305 is shortened due to the optional connection 335 between the second terminal 332 and the third terminal 333 of the interface 330 of the second apparatus 340, and thus the electric potential of the second line 302 at the second end 307 of the cable 305 is substantially the same as the electric potential of the shield line 302 at the second end 307 of the cable 305 if the second end 307 of the cable 305 is connected to the interface 330 of the second apparatus 340. If the cable 305 is not connected to the interface 330 of the second apparatus 340, the second terminal 322 and the third terminal 323 of the second interface 320 of cable 305 may not be connected to each other. For instance, interface 330 of the second apparatus 340 may represent an USB compatible interface, wherein the first terminal 331 may represent a power terminal, the second terminal 332 may represent a ground terminal, and the third terminal may represent a third terminal, wherein connection 335 is used for setting ground potential to the shield line 323 at the second portion 307 of the cable 305 when the cable 305 is connected to the USB compatible interface 330.

And/or, as another example, the second terminal 322 and the third terminal 323 of the second interface 320 of the cable 305 may be connected to each other by means of an optional connection 325 (not allowed on USB cables), as exemplarily depicted in FIG. 2 by dashed lines 325. In this case, for instance, the second interface 320 may mechanically differ from the first interface 330 in such a way that the second interface 320 can not be connected to the interface 110 of the first apparatus 100', and/or, the first interface 310 may be configured to be not connectable to the interface 330 of the second apparatus 340. Thus, it may be achieved that optional connection 325 in the cable 305 shortens the second terminal 112 and the third terminal 113 of the interface 110 of the first apparatus 100' since it is not possible to connect the second interface 320 of cable 305 to the interface 110 of the first apparatus 100'.

It may be assumed that no current or only a very small current flows through the shield line 303 of the cable 305 when the cable 305 is connected to the first and the second apparatus 100', 340, since the main part or all part of the current provided from the charger 120 to the second apparatus 340 flows through the first line 301 and the second line 302 of the cable 305. Accordingly, no voltage drop or only a very small voltage drop occurs on the shield line 303, whereas a significant voltage drop may occur on the first line and on the second line, as explained above. This absence of a voltage drop on the shield line 303 may be used for estimating or determining the voltage drop on the second line 302 of cable 305, wherein the voltage 140 between the third terminal 113 and the second terminal 112 of the interface 110 of the first apparatus 100', which may be denoted as voltage $V_e$ 140, may substantially correspond to a voltage drop between second terminal 322 of the second interface 320 of the cable 305 and the second terminal 312 of the first interface 310 of the cable 305 in accordance with Kirchhoff's law. Accordingly, voltage $V_e$ 140 may be considered as a representation of the voltage drop across the second line 302 of the cable 305 when the cable is connected to both the first apparatus 100' and the second apparatus 340.

Under the non-limiting assumption that the first line 301 and the second line 302 have a substantially same electrical resistance, the voltage drop across the first line 301 will be approximately the same as the voltage drop across the second line 302 of the cable 305. Accordingly, voltage $V_e$ 140 between the third terminal 113 and the second terminal 112 of the interface 110 of the first apparatus 100' may be used for estimating or determining the sum of voltage drop across both the first line 301 and the second line 302 of the cable 305, wherein this sum of voltage drop may be denoted as $V_d$ and may be twice of the voltage $V_e$ 140 between the third terminal 113 and the second terminal 112 of the interface 110:

$$V_d = 2 \cdot V_e. \tag{3}$$

Or, as another example, if the resistance R1 of the first line 301 differs from the resistance R2 of the second line 302, the sum of voltage drop $V_d$ may be estimated as $$V_d = V_e \cdot (1 + (R1/R2)). \tag{4}$$

Accordingly, the voltage $V_e$ between the third terminal 113 and the second terminal 112 of the interface 110 of the first apparatus 100' may be considered as a representative of the sum of the voltage drop across the first line 301 and across the second line 302 of the cable 305, wherein the voltage $V_e$ may be considered to be representative of a cable loss occurred during providing power from the charger 120 to the second apparatus 340. Thus, the compensation voltage $V_c$ depends on the voltage $V_e$ between the third terminal 113 and the second terminal 112 of the interface 110 of the first apparatus 100'.

For instance, the compensation voltage $V_c$ may be equal or approximately equal to the sum of the voltage drop as explained above, i.e. $V_c = V_d$ when applying equation (3) or (4) may hold. As an example, the compensation voltage $V_c$ may be approximately between one and a half (i.e., 1.5) and two and a half (i.e., 2.5) of the voltage $V_e$ 140 between the third terminal 113 and the second terminal 112 of the interface 110 of the first apparatus 100'.

As an example, the interface 110 of the first apparatus 100', the first and second interfaces 310, 320 of the cable 305 and the interface 330 of the second apparatus 340 may represent USB compatible interfaces, wherein the interfaces 310, 320 may comprise further terminals which might be used for data transmission. Accordingly, the cable 305 may represent a USB cable and/or may comprise further lines which might be configured to transmit data. The first interface 310 of the cable 305 may comprise a connector being configured to be connected and disconnected to the interface 110 of the first apparatus 100', and the second interface 320 of the cable 305 may comprise a connector being configured to be connected and disconnected to the interface 330 of the second apparatus 340.

Furthermore, as another example, the first end 306 of the cable 305 may be fixedly connected to the interface 110 of the first apparatus 100', i.e., and/or, the second end 307 of the cable 305 may be fixedly connected to the interface 330 of the second apparatus 340. Accordingly, for instance, the first interface 310 of the cable 305 may represent an optional interface which might be omitted when the lines 301, 302, 303 at the first end 306 of the cable 305 are fixedly connected to the terminals 111, 112, 113 of the interface 110 of the first apparatus 100', respectively, and/or, for instance, the second interface 310 of the cable 305 may represent an optional interface which might be omitted when the lines 301, 302, 303 at the second end 307 of the cable 305 are fixedly connected to the terminals 331, 332, 333 of the interface 330 of the second apparatus 340, respectively.

Figure 4:
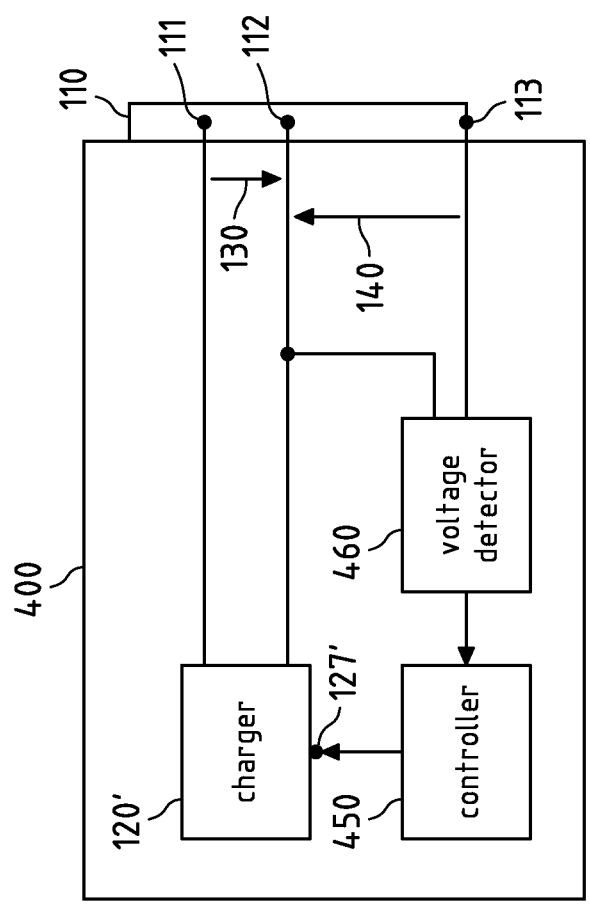
FIG. 4: a second example embodiment of an apparatus according to an aspect of the invention.

FIG. 4 depicts a second example embodiment of an apparatus 400 according to an aspect of the invention. This apparatus 400 may be based on the apparatus 100 depicted in FIG. 1 and on the first apparatus 100' depicted in FIG. 3. Thus, the explanations presented with respect to apparatus 100 and the first apparatus 100' may also hold for the apparatus 400 depicted in FIG. 4.

The apparatus 400 comprises a controller 450 which is configured to control the charger 120', wherein this controlling may comprise controlling the charger 120' such that charger provided the voltage $V_i$ 130 between the first terminal 111 and the second terminal 112 based on the predefined voltage $V_p$ and the compensation voltage $V_c$. The controller 450 is connected to a voltage detector 460. The voltage detector 460 is configured to detect the voltage between the third terminal 113 and the second terminal 112 of the interface 110 and configured to provide a representative of this detected voltage to the controller. Thus, the controller 450 may configured to determine the compensation voltage $V_c$ based on the detected voltage $V_i$ 130 between the first terminal 111 and the second terminal 112, and based on the determined compensation voltage $V_c$ the controller 450 may control the charger 120' to provide the voltage $V_i$ 130 between the first terminal 111 and the second terminal 112 based on the predefined voltage $V_p$ and the compensation voltage $V_c$. For instance, the charger 120' may comprise an input 127' configured to receive a control signal outputted from the controller 450.

For instance, the controller 450 may provide the determined compensation voltage $V_c$ to the charger 120' or a representative of the determined compensation voltage $V_c$, which might represent a value being indicative of the compensation voltage $V_c$, as the above mentioned control signal to the charger 120' and the charger 120' may be configured to shift the predefined voltage $V_p$ with a voltage value corresponding to the compensation voltage $V_c$. Or, as another example, the controller 450 may be configured to determine the voltage $V_i$ 130 to be provided between the first terminal 111 and the second terminal 112 based on the predefined voltage $V_p$ and based on the determined compensation voltage $V_c$ and might be configured to provide this determined voltage $V_i$ or a representative of this determined voltage $V_i$, which might represent a value being indicative of the voltage $V_i$ to provided, and the charger 120' may be configured to provide a corresponding voltage $V_i$ between the first terminal 111 and the second terminal 112.

For instance, the controller 450 might represent a microcontroller or any other hardware circuitry being configured to perform the above explained control functionality.

Figure 5:
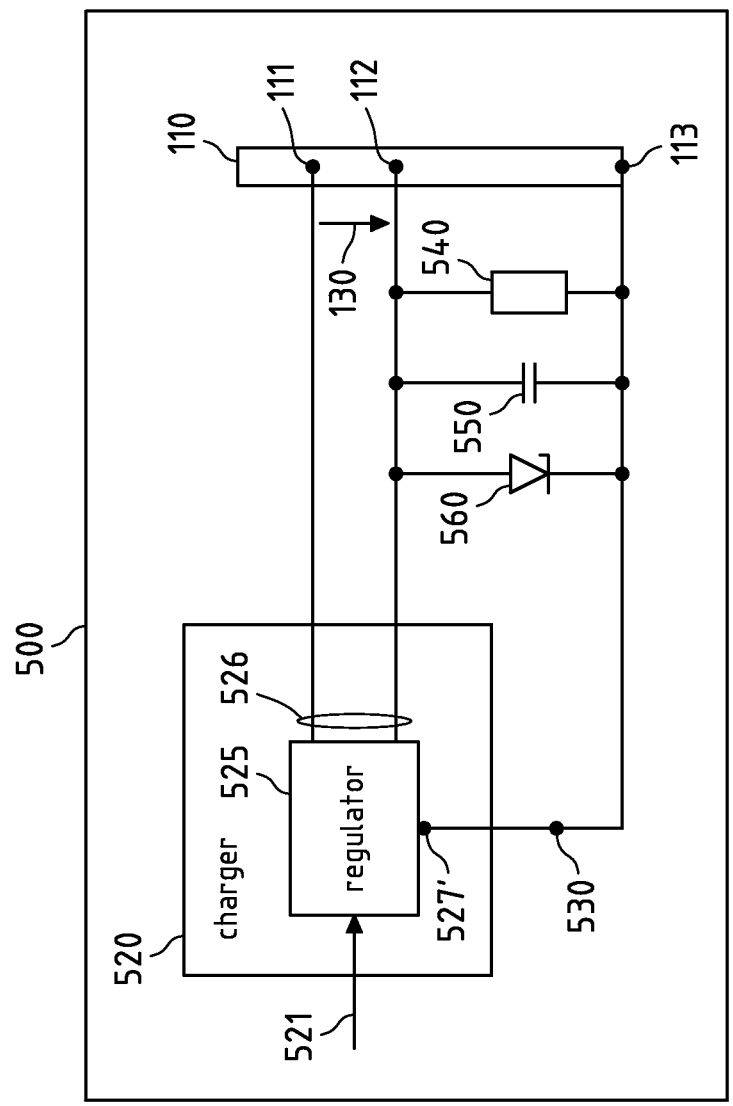
FIG. 5: a third example embodiment of an apparatus according to an aspect of the invention.

FIG. 5 depicts a third example embodiment of an apparatus 500 according to an aspect of the invention. This apparatus 500 may be based on the apparatus 100 depicted in FIG. 1 and/or on the first apparatus 100' depicted in FIG. 3. Thus, the explanations presented with respect to apparatus 100 and the first apparatus 100' may also hold for the apparatus 500 depicted in FIG. 5.

The apparatus 500 comprises a reference ground 530 which is connected to the charger 520, wherein the reference ground 530 is further connected to the third terminal 113 of the interface. The charger 520 comprises a regulator 525 which may for instance be provided with an input voltage 521 in order to be provided by power for operating the regulator 525, wherein the regulator 525 is configured to provide the voltage $V_i$ 130 between the first terminal 111 and the second terminal 112. The regulator 525 may comprise an input 527 which is connected to the reference ground 530.

The voltage at the reference ground 530 may be used by the charger 520, and in particular by the regulator 525, to obtain or determine the compensation voltage $V_c$. For instance, the compensation voltage $V_c$ may be obtained or determined in accordance with any of the above presented examples. The voltage at the reference ground 530 may represent the voltage between the reference ground 530 and the second terminal 112 of the interface 110, for instance, under the assumption that the second terminal 112 is associated with a ground line.

As an example, the charger 520 may be configured to shift the predefined $V_p$ with the compensation voltage $V_c$ for providing the voltage $V_i$ 130 between the first terminal 111 and the second terminal 112.

For instance, if the voltage at the reference ground 530 is zero since the voltage at the third terminal 113 is the same as the voltage at the second terminal 112, the regulator 525 of the charger may (at least inherently) determine the compensation voltage to be $V_c=0$, and thus the regulator 525 will only provide predefined voltage $V_p$ as voltage $V_i$ 130 between the first terminal 111 and the second terminal 112 without any voltage shift. Otherwise, as an example, if the voltage at the reference ground 530 is not zero, the regulator obtains or determines the compensation voltage $V_c$ based on the voltage at the reference ground 530 and shifts the predefined voltage predefined voltage $V_p$ with the compensation voltage $V_c$ in order to provide this shifted voltage $V_i$ 130 between the first terminal 111 and the second terminal 112:

$$V_i = V_p + V_c$$

The regulator 525 may represent hardware circuitry and may optionally comprise software. For instance, obtaining the compensation voltage $V_c$ may be performed by a hardware circuitry without any software, or a software running on a processor may be used for obtaining or determining the compensation voltage $V_c$. Furthermore, as an example, it has to be understood that it may be not necessary to determine or obtain a value corresponding to the compensation voltage, but the regulator is configured to provide voltage $V_i$ 130 between the first terminal 111 and the second terminal 112 based on the predefined voltage $V_p$ and the compensation voltage $V_c$, e.g. by means of the providing the predefined voltage $V_p$ shifted with the compensation voltage $V_c$, and thus the voltage $V_i$ 130 provided between the first terminal 111 and the second terminal 112 by the regulator may be considered to inherently comprise the compensation voltage $V_c$.

Furthermore, regulator 525 may be configured to adjust the voltage $V_i$ 130 provided between the first terminal 111 and the second terminal 112 in predefined time intervals or continuously based on the voltage at the reference ground 525. Accordingly, if the current flowing through the first and second terminal 111, 112 during charging a further apparatus varies and thus a voltage drop on a connected cable would change, the voltage $V_i$ 130 provided between the first terminal 111 and the second terminal 112 would be adapted in accordance with this change based a change of the voltage at the reference ground 530.

As an example, the apparatus 500 may optionally comprise at least one resistor 540 placed between the third terminal 113 and the second terminal 112. In FIG. 5 only one optional resistor 540 is depicted without any limitations. For instance, the resistance of resistor 540 may be in a range between 10Ω and 100Ω, preferably between 30Ω and 60Ω, e.g., approximately or exactly 47Ω. Thus, the reference ground 530 is stable even when no cable is connected to interface 110 since the reference ground 530 is electrically connected to the second terminal 112.

Furthermore, as an example, the apparatus 500 may optionally comprise a voltage limiting element 560 placed between the third terminal 113 and the second terminal 112. This optional voltage limiting element 560 is configured to limit the voltage between the third terminal 113 and the second terminal 112 to a predefined maximum voltage. Thus, for instance, this voltage limiting element 560 may prevent that in case of a very high voltage between the third terminal 113 and the second terminal 112, which may for instance occur due to a broken line in a connected cable 305, e.g. the shield line 303, the compensation voltage $V_c$ simultaneously increases to a very high voltage and thus, providing a very high voltage at the output 526 of the regulator 525 used as voltage $V_i$ 130 between the first terminal 111 and the second terminal 112 can be prevented. For instance, this voltage limiting element 560 may represent a protection diode 560, wherein the protection diode 560 may for instance represent a Zener diode 560 (as exemplarily depicted in FIG. 5) operated in breakthrough direction, wherein the breakthrough voltage of the Zener diode 560 represents the predefined maximum voltage. As an example, the predefined maximum voltage may be in a range between 0.5V and 3V, preferably between 1V and 2V, e.g. approximately or exactly 1.2V. Furthermore, for instance, if the shield line 303 of the cable 305 is broken, the charger 520 may be configured to operate in an uncompensated mode without shifting the predefined voltage $V_p$ and/or providing a maximum current of 1 A.

Or, as another example, the charger 520 may comprise an optional overvoltage protection means which prevents that the voltage provided at the output 526 of the regulator 525 exceeds a predefined maximum output voltage. For instance, this predefined maximum output voltage may represent the sum of predefined voltage $V_p$ and a further voltage value, wherein this further voltage value may be in a range between 1V and 6V, preferably between 2V and 4V, e.g. approximately or exactly 2.4V. Furthermore, if the charger 520 comprises this over protection means, the optional voltage limiting element 560 may be omitted.

Furthermore, for instance, the apparatus 500 may comprise an optional electromagnetic compatibility element (EMC) 550 placed between the third terminal 113 and the second terminal 112.

This optional EMC 550 may for instance be configured to electrically connect the third terminal 113 to second terminal 112 for high frequencies, e.g., for frequencies higher than 1 kHz, or 10 kHz, or 100 kHz or higher than 1 MHz, or higher than any other suited frequency, wherein the optional EMC 550 may be configured not to electrically connect the third terminal 113 to second terminal 112 for low frequencies, which are lower than the high frequency, e.g., for low frequencies less than 10 kHz, 1 kHz, 200 Hz, wherein any other well suited low frequency may be used. Thus, as an example, this EMC 550 may be represented by a high-pass.

For instance, the EMC 550 may comprise or represent a capacitor 550, as exemplarily depicted in FIG. 5.

Accordingly, the EMC 550 may be configured to prevent that high frequency signals are emitted from the shield line 303 of a cable 305 connected to the interface 110 of the apparatus 500.

Figure 6:
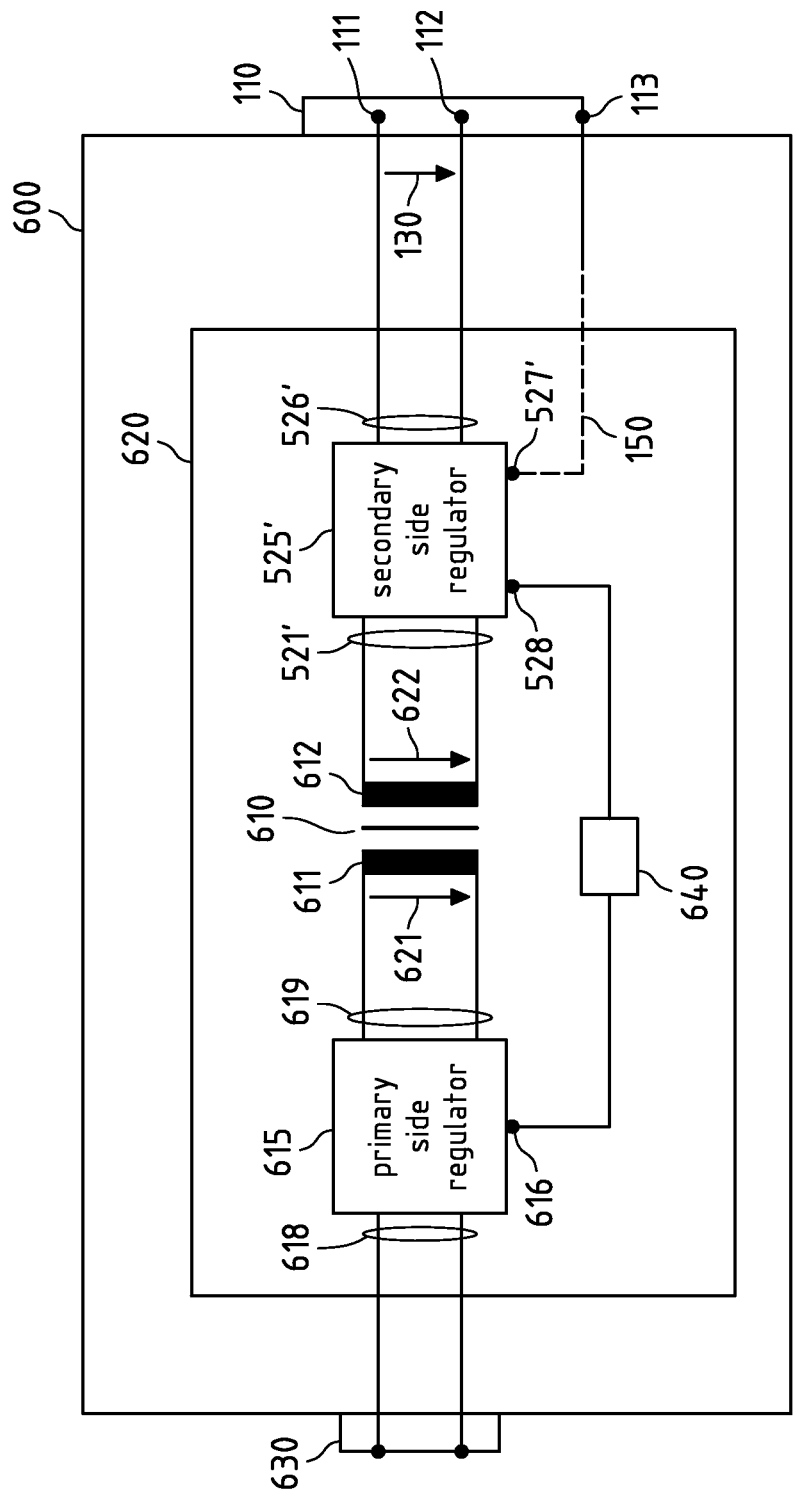
FIG. 6: a fourth example embodiment of an apparatus according to an aspect of the invention.

FIG. 6 depicts a fourth example embodiment of an apparatus 600 according to an aspect of the invention. This apparatus 600 may be based on the apparatus 100 depicted in FIG. 1 and/or on the first apparatus 100' depicted in FIG. 3 and/or on apparatus 400 depicted in FIG. 4 and/or on apparatus 550 depicted in FIG. 5. Thus, the explanations presented with respect to apparatus 100, the first apparatus 100' and apparatuses 400 and 500 may also hold for the apparatus 600 depicted in FIG. 6.

The apparatus 600 comprises a power supply interface 630 being configured to be connected to a power supply, e.g. an external power supply, as described with respect to the first example of an apparatus 100 according to an aspect of the invention. Furthermore, the apparatus 600 comprises a transformer 610 being connected at the primary side 611 to the power supply interface 630 in order to receive power from the power supply interface 630, wherein the charger 620 may comprise a primary side regulator 615 which comprises an input 611 configured to receive power from the power supply interface 630 and which comprises an output 612 configured to provide a regulated voltage 621 to the primary side 611 of the transformer 610.

The transformer is configured to transform a voltage 621 at the primary side down to a voltage 622 provided at the secondary side 612 of the transformer 610, wherein the charger 620 comprises a secondary side regulator 525' which comprises an input 521' for receiving the voltage 622 provided at the secondary side 612 of the transformer 610 and which comprises an output 526' configured to provide the voltage $V_i$ 130 provided between the first terminal 111 and the second terminal 112 of the interface 110 of the apparatus 600. This secondary side regulator 525' may for instance realized by or based on the regulator 525 depicted in FIG. 5 or by any of the chargers 120 and 120' depicted in FIGS. 1, 3 and 4. The secondary side regulator 525' comprises a further input 527', wherein this further input 527' may for instance correspond to the input 127' of charger 120' depicted in FIG. 4 in or to receive a control signal for providing the to provide the voltage $V_i$ 130 provided between the first terminal 111 and the second terminal 112 based on the voltage between the third terminal 113 and the second terminal 112, or wherein this further input 527' may for instance correspond to input 527 of the regulator 525 depicted in FIG. 5 in order to provide a reference ground voltage to the regulator 525', wherein the type of further input 527' depends on the realization of regulator 525'. It has to be understood that the regulator 525' may implement any of the described methods for providing the voltage $V_i$ 130 provided between the first terminal 111 and the second terminal 112 based on the predefined voltage $V_p$ and the compensation voltage $V_c$, as exemplarily indicated by dashed line 150.

Accordingly, the high voltage alternating current (AC) provided from the power supply interface 630 via the optional primary side regulator 615 may be provided as primary side voltage 621 to the transformer 610, or the primary side voltage 621 may at least depend on the high voltage provided from the power supply interface 630, and the transformer 610 may provide a transformed lower AC voltage 622 to the input 521' of the secondary side regulator 525' which is configured to provide a direct current (DC) at the output 526' in order to provide the DC voltage $V_i$ 130 between the first terminal 111 and the second terminal 112 of the interface 110. Thus, the input voltage 622 of the secondary side regulator 525' may be used by the secondary side regulator 525' for generating the voltage $V_i$ 130 between the first terminal 111 and the second terminal 112, wherein the secondary side regulator 525' is configured to regulate this voltage $V_i$ 130 in order to be based (or to depend) on the predefined voltage $V_p$ and the compensation voltage $V_c$, as explained above.

Furthermore, as an example, the secondary side regulator 525' may comprise an optional second output 528 which may for instance be configured to provide a representative of the voltage or current at the input 521' of the secondary side regulator 525' or a representative of a voltage or current based on the voltage or current at the input 521' of the secondary side regulator 525'. For instance, this voltage or current based on voltage or current at the input 521' of the secondary side regulator 525' may represent a rectified voltage or current obtained by rectifying the voltage 622 or current provided at the secondary side 612 of the transformer 610. This representation of the voltage/and or current may be used as a feedback signal which is fed back to a further input 616 of the primary side regulator 615' and may be used to regulate the voltage 612 or current provided at the output 619 of the primary side regulator 615.

For instance, an optional decoupling element 640 may be placed between the further input 616 of the primary side regulator 615 and the further output 528 of the secondary side regulator 525', where the optional decoupling element 640 may be configured to perform a galvanic separation. Thus, the decoupling element 640 may represent a galvanic separation element 640 which is configured to perform a galvanic separation between the further output 528 of the secondary side regulator 525' and the further input 616 of the primary side regulator 615. For instance, this galvanic separation element 640 may represent an optocoppler.

Furthermore, as an additional or optional example, the further output 528 of the secondary side regulator 525' may provide a representative of the voltage and/or current provided at the output 526' of the secondary side regulator 525', wherein this representative is fed back to the input 616' of the primary side regulator 615 and wherein the primary side regulator 615 is configured to regulate the voltage 611 and/or current provide at its output 619 based on this received representative.

As used in this application, the term 'circuitry' refers to all of the following:
(a) hardware-only circuit implementations (such as implementations in only analog and/or digital circuitry) and
(b) combinations of circuits and software (and/or firmware), such as (as applicable):
(i) to a combination of processor(s) or
(ii) to portions of processor(s)/software (including digital signal processor(s)), software, and memory(ies) that work together to cause an apparatus, such as a mobile phone or a positioning device, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry"

would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a positioning device.

With respect to the aspects of the invention and their embodiments described in this application, it is understood that a disclosure of any action or step shall be understood as a disclosure of a corresponding (functional) configuration of a corresponding apparatus (for instance a configuration of the computer program code and/or the processor and/or some other means of the corresponding apparatus), of a corresponding computer program code defined to cause such an action or step when executed and/or of a corresponding (functional) configuration of a system (or parts thereof).

The aspects of the invention and their embodiments presented in this application and also their single features shall also be understood to be disclosed in all possible combinations with each other. It should also be understood that the sequence of method steps in the flowcharts presented above is not mandatory, also alternative sequences may be possible.

The invention has been described above by non-limiting examples. In particular, it should be noted that there are alternative ways and variations which are obvious to a skilled person in the art and can be implemented without deviating from the scope and spirit of the appended claims.

The invention claimed is:

1. An apparatus, comprising:
an interface configured to be connected to a cable, the interface comprising: a first terminal configured to be connected to a first line of the cable; a second terminal configured to be connected to a second line of the cable; and a third terminal configured to be connected to a shield line of the cable; and
a charger configured to provide a voltage between the first terminal and the second terminal, wherein the voltage is based on a predefined voltage and a compensation voltage, the compensation voltage being dependent on a voltage between the third terminal and the second terminal.

2. The apparatus according to claim 1, wherein the compensation voltage is approximately between one and a half and two and a half of the voltage between the third terminal and the second terminal.

3. The apparatus according to claim 1, wherein the charger is configured to shift the predefined voltage with the compensation voltage for providing the voltage between the first and the second terminal.

4. The apparatus according to claim 1, comprising a reference ground connected to the charger, wherein the reference ground is connected to the third terminal such that the compensation voltage is dependent on the voltage of the reference ground.

5. The apparatus according to claim 1, comprising a resistor placed between the third terminal and the second terminal.

6. The apparatus according to claim 1, wherein the first terminal comprises a power terminal and the second terminal comprises a ground terminal.

7. The apparatus according to claim 1, wherein the interface comprises a USB interface.

8. A system, comprising:
a cable comprising a first line, a second line and a shield line; a first apparatus comprising:
an interface configured to be connected to the cable, the interface comprising: a first terminal configured to be connected to the first line of the cable; a second terminal configured to be connected to the second line of the cable; and a third terminal configured to be connected to the shield line of the cable; and
a charger configured to provide a voltage between the first terminal and the second terminal, wherein the voltage is based on a predefined voltage and a compensation voltage, the compensation voltage being dependent on a voltage between the third terminal and the second terminal;
a second apparatus comprising an interface configured to be connected to the cable, wherein a first end of the cable is connected to the interface of the first apparatus such that the first line is connected to the first terminal, the second line is connected to the second terminal, and the shield line is connected to the third terminal; and
wherein a second end of the cable is connected to the interface of the second apparatus such that the electrical potential of one of the first line and the second line at the second end of the cable and the electrical potential of the shield line at the second end of the cable are substantially the same.

9. The system according to claim 8, wherein the interface of the second apparatus is configured to connect the ground line and the shield line of a cable connected to the interface of the second apparatus to each other.

10. The system according to claim 8, wherein the interface of the second apparatus comprises a USB interface.

11. A method performed by an apparatus, comprising:
providing a voltage between a first terminal and a second terminal of an interface of the apparatus, the interface being configured to be connected to a cable, wherein the first terminal is configured to be connected to a first line of the cable, the second terminal is configured to be connected to a second line of the cable, and wherein the interface comprises a third terminal configured to be connected to a shield line of the cable, wherein the provided voltage is based on a predefined voltage and a compensation voltage, the compensation voltage being dependent on a voltage between the third terminal and the second terminal.

12. The method according to claim 11, comprising measuring the voltage between the third terminal and the second terminal and determining the compensation voltage based on the measured voltage.

13. The method according to claim 11, wherein the compensation voltage is approximately between one and a half and two and a half of the voltage between the third terminal and the second terminal.

14. The method according to claim 11, wherein the providing a voltage between the first terminal and the second terminal of the interface comprises shifting the predefined voltage with the compensation voltage.

15. The method according to claim 11, wherein the voltage between the first terminal and the second terminal of the interface is provided by a charger of the apparatus, the apparatus comprising a reference ground connected to the charger, wherein the reference ground is connected to the third terminal such that the compensation voltage is dependent on the voltage of the reference ground.

16. The method according to claim 11, wherein the apparatus comprises a resistor placed between the third terminal and the second terminal.

17. The method according to claim 11, wherein the apparatus comprises a voltage limiting element placed between the third terminal and the second terminal.

18. The method according to claim 11, wherein the first terminal comprises a power terminal and the second terminal comprises a ground terminal.

19. The method according to claim 11, wherein the interface comprises a USB interface.

20. A computer program product comprising a least one computer readable non-transitory memory medium having program code stored thereon, the program code which when executed by an apparatus causes the apparatus to provide a voltage between a first terminal and a second terminal of an interface of the apparatus, the interface being configured to be connected to a cable, wherein the first terminal is configured to be connected to a first line of the cable, the second terminal is configured to be connected to a second line of the cable, and wherein the interface comprises a third terminal configured to be connected to a shield line of the cable, wherein the provided voltage is based on a predefined voltage and a compensation voltage, the compensation voltage being dependent on a voltage between the third terminal and the second terminal.

* * * * *